United States Patent

[11] 3,587,471

| [72] | Inventor | Kurt P. Schneider<br>Detroit, Mich. |
|---|---|---|
| [21] | Appl. No. | 823,801 |
| [22] | Filed | May 12, 1969 |
| [45] | Patented | June 28, 1971 |
| [73] | Assignee | Jack W. Schneider<br>Taylor, Mich.<br>fractional part interest |

[54] RAPID TRANSIT SYSTEM
19 Claims, 10 Drawing Figs.

[52] U.S. Cl. .................................... 104/23FS,
104/23, 104/134
[51] Int. Cl. ....................................... B60v 3/04,
B60v 1/04
[50] Field of Search .......................................... 104/23, 23
(FS), 134, 139, 138

[56] References Cited
UNITED STATES PATENTS

| 415,991 | 11/1889 | Zipernowsky ................ | 104/139 |
| 1,165,898 | 12/1915 | Peck .............................. | 104/139 |
| 3,443,524 | 5/1969 | Schneider ...................... | 104/23P.S. |

FOREIGN PATENTS

| 913,736 | 12/1962 | Great Britain ................ | 104/138 |

Primary Examiner—Arthur L. La Point
Assistant Examiner—D. W. Keen
Attorney—Cullen, Sloman and Cantor ABSTRACT: A projectilelike transport with a narrow runner projecting into a pneumatic tube and into the slightly recessed surface of rolls that are supported on hydrostatic bearings. Winged connector cars with wheels at the tips in special wheel housings that engage overhead tracks on curves. A flexible rapid transit system adaptable to subsurface or elevated sections of city or country side.

INVENTOR
KURT P. SCHNEIDER

Cullen, Sloman, & Cantor
BY
ATTORNEYS

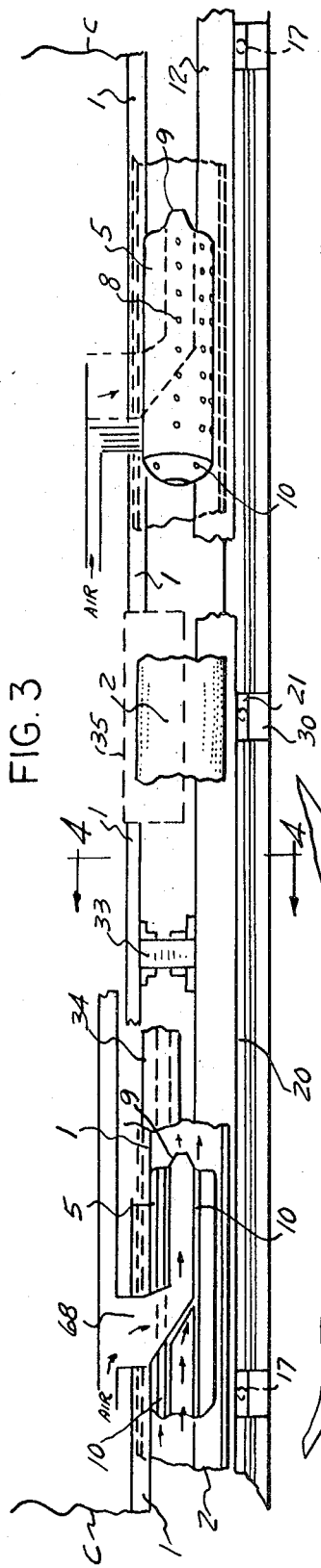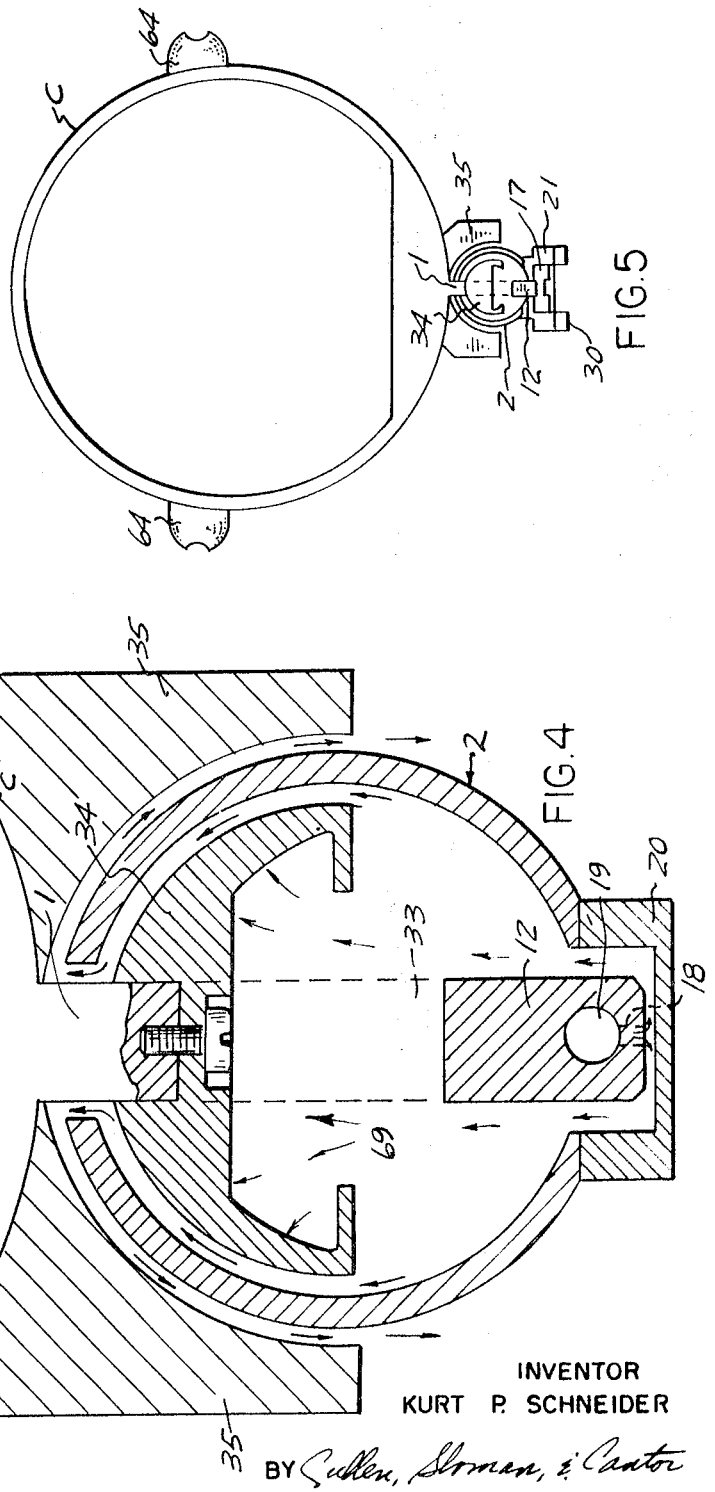

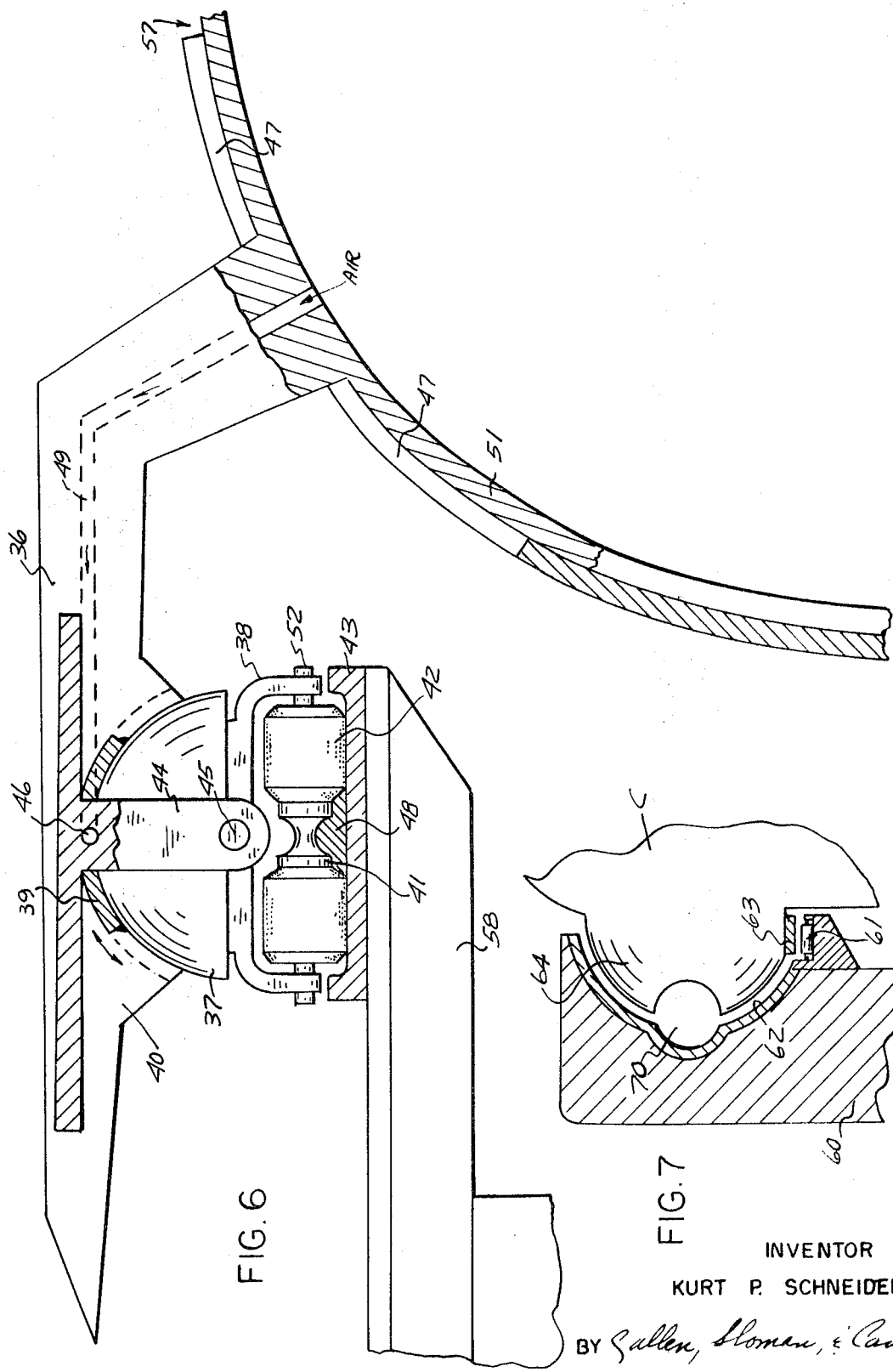

INVENTOR
KURT P. SCHNEIDER

BY Cullen, Sloman, & Cantor

ATTORNEYS

RAPID TRANSIT SYSTEM

BRIEF DESCRIPTION OF THE DISCLOSURE

It is an object to give aerodynamic shape to the transport and greatly reduce surface contact and accompanying vibration.

It is a further object to induce greater airlift capability by envelopment of air pressure and propulsion devices so that air pressure is retained rather than dissipated.

It is a further object to provide hydrostatic bearings in the roll ends, so that friction in the bearings is greatly reduced, and the surface contact of the transport is for all practical purposes separated by air and oil under pressure, reducing noise, shock and giving air-flight characteristics at ultra-high speed on long-distance intercity flights.

It is a further object to provide bearings with super-spin characteristics, and better able to withstand the heavy duty and constant impact of mass movement in extremely high-density population centers.

It is an object to provide pneumatic floats that give propulsion and air cushioning, impart a steadiness to repetitious starting and stopping in urban use where stopping points are moments apart, and in which acceleration and deceleration are especially noticeable to the passenger.

It is another object to adapt the connector car to greater speeds on curves by the use of wings that extend out from the top of the connector cars engaging in an overhead track with the outside track slightly raised above but paralleling the inner track so that the center of gravity of the transport is inclined closer to the lower track.

The present invention is an improvement of the rapid transit system disclosed in my copending U.S. Pat application, Ser. No. 662,517 filed Aug. 22, 1967, now U.S. Pat. No. 3,443,524 dated May 13, 1969.

BRIEF DESCRIPTION OF THE DRAWINGS

FIG. 3 is a fragmented longitudinal sectional view of the pneumatic tube with the car runner, longitudinal air bearing, pneumatic floats, one showing the multitude of air ports and the other showing the pressure bypass tubes and the prime mover jet tube and nozzle, and supporting struts, the air bearing and fluid supply lines.

FIG. 4 is a cross section on line 4—4, FIG. 3, of the pneumatic tube in the space between the pneumatic floats with the car strut running through the longitudinal air bearing to the car runner, and the surrounding pneumatic tube with air levitation channel, on an increased scale.

FIG. 5 is a cross-sectional view of a car with the car airfoil, car strut, car runner, hydrostatic supported roller and pneumatic tube.

FIG. 6 is a fragmentary end elevational view of one of the wings from the top of the connector car with steel wheel engaging the rail and the side traction wheels, and with rounded wheel socket.

FIG. 7 is a fragmentary transverse elevational section showing one of the car lateral side supports.

DETAILED DESCRIPTION OF THE DRAWINGS

Figure 1:
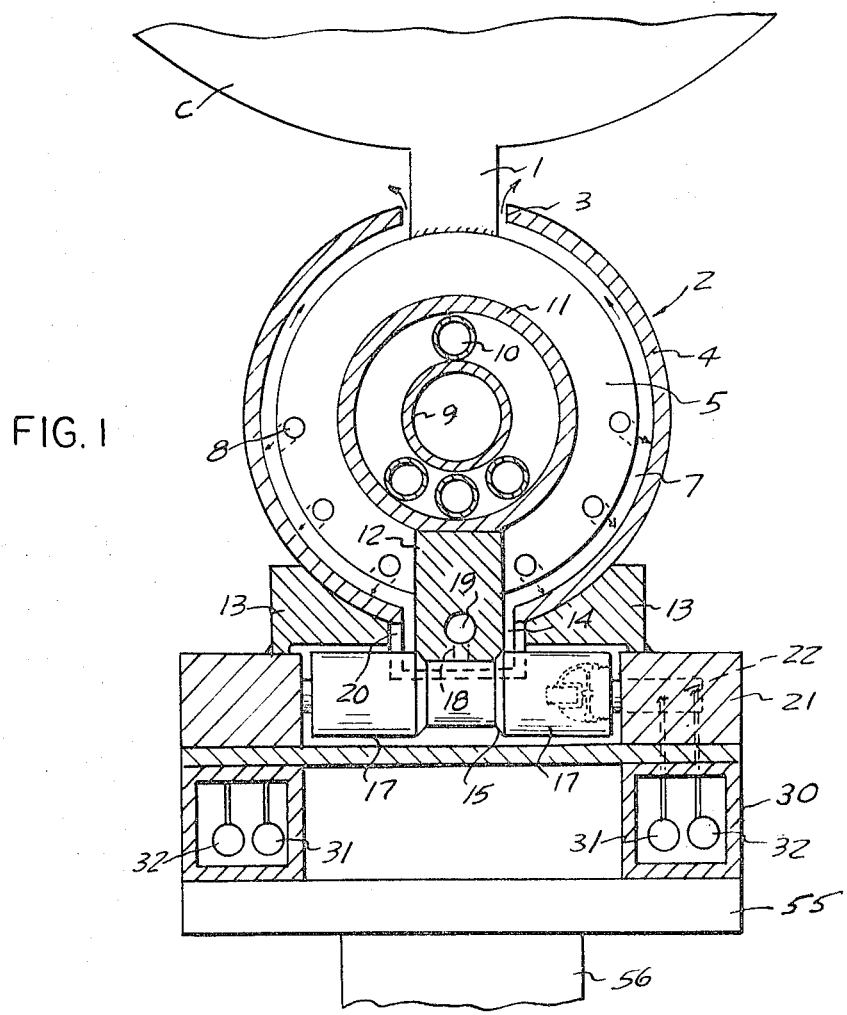
FIG. 1 is a fragmented partially sectioned view of the vehicle or car, pneumatic tube, supporting car under carriage, pneumatic floats, with air ducts, air pressure bypass tubes, jet nozzle, car runner, recessed rollers, the combination fluid-supplied ball bearings and supporting structures with air and oil supply lines.

FIG. 1 illustrates undercarriage 1 positioned longitudinally under and along passenger car C center extending into pneumatic tube 2 through clearances 3 in and along tubular wall 4 connecting the top surfaces of the spaced pneumatic floats 5. The sectional view further shows the pneumatic tube with clearance 7 which allows the floats to move freely inside and longitudinally of the tube and allows gas or air under pressure to issue from ports 8 obliquely directed in relation to the interior wall of the tube. Centered through the longitudinal center of the float is the jet tube 9 which is the prime mover of the transport.

Surrounding the jet tubes are the open ended air pressure bypass tubes 10 to allow the float to penetrate air under pressure from the exhausting gas or air issuing from the rear of the more forward floats on the cars ahead. Encompassing these tubes is the tubing 11 which secures the floats to car runner 12 which extends through air space 14 between channels 13. The car runner further protrudes into the recessed surface 15 of rolls 17.

The beveled undersurface of the runner 12 contains a series of air openings 18 from duct 19 which runs the length of the car runner. Said duct is connected to a source of air under pressure. A plurality of these openings are directed against the floor surface of air levitation channel 20, FIG. 4 located between the rolls, and joined to blocks 21 which support hydrostatic bearings 22.

Centered through the opposed pairs of hydrostatic support bearings is the oil line 23 and oil conduits 23' that supply oil under pressure to ball bearings 25. These bearings give additional support to the impact of runner 12. Sealing of oil pressure at the junction of the bearing and roller surfaces is assisted by air pressure line 26 and conduits 24.

Figure 2:
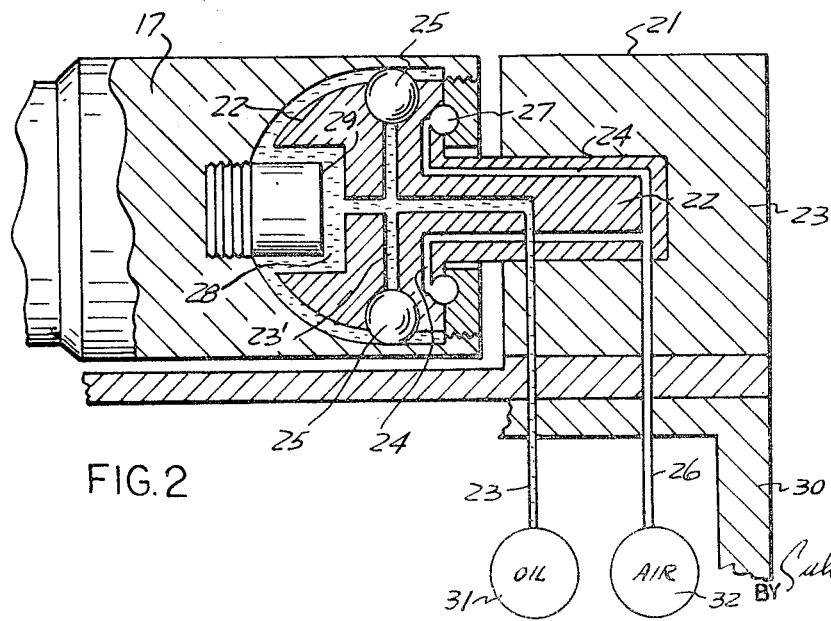
FIG. 2 is a cross-sectional fragmentary view of a fluid-supplied bearing, enclosed by the roll end corresponding to FIG. 1 and on an increased scale.

FIG. 2 is a fragmentary view of the bearing assembly and roller end on an increased scale. Hydrostatic bearing 22 is mounted within support block 21 in which oil line 23 and air pressure line 26 enter at the center of the bearing to the air and oil conduits. Ball bearings 25 seal off fluid chamber 28, which provides the bearing spin area for shaft 29 threaded into the concaved roller end. Said chamber receives pressure fluid from line 23. The revolving of the roll end and the spin of shaft 29 increases oil pressure in chamber 28.

Air line 26 connects conduits 24 so that air pressure in spaces 27 seals off oil where the fluid-supplied bearings and the roll end surfaces are in contact.

Blocks 21 are supported upon the tubular structures 30 which enclose the oil and air supply lines 31 and 32, which are supplied from terminal supply and pressure stations along the right of way.

FIG. 3 shows the pair of spaced pneumatic floats 5 for each car which move freely in pneumatic tube 2. Both floats include the prime mover propulsion jet 9 and the bypass tubes 10. Both floats have a plurality of conduits 8 with angular outlet ports spaced in the lower half of the float, FIG. 1, so that lift is provided from its undersurface.

Figure 9:
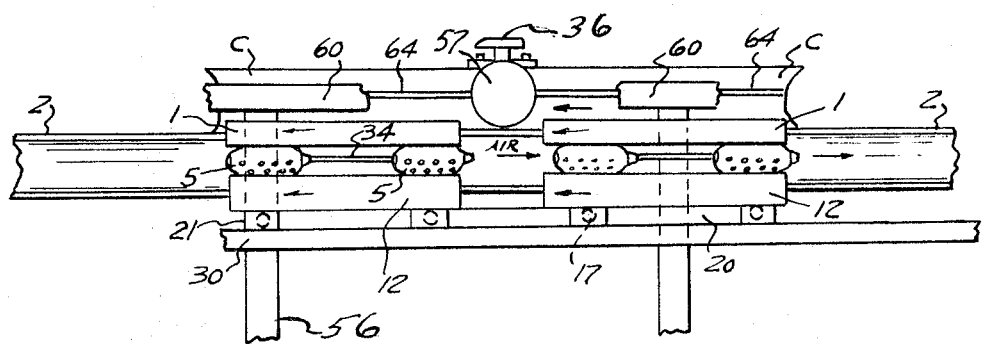
FIG. 9 is a fragmentary side elevational view of a connector and adjacent cars.

Along the length of the car, under and extending between the floats is car runner 12 secured to the transport under carriage 1 by struts 33. These extend through longitudinal air bearing 34, FIG. 4. Supporting the pneumatic tube 2 are tubular structures 30 on cross supports 55 and spaced standards 56, FIG. 9. FIG. 4 is a fragmentary cross-sectioned view of pneumatic tube 2 in the space between the floats showing the longitudinal air bearing 34 secured to under carriage 1 and to runner 12 in air levitation channel 20.

FIG. 5 is a cross-sectional view of the pneumatic tube 2 similar to FIG. 4 but with runner 12 engaging one of the rolls 17. Surrounding the upper surface of the tube are the transport airfoils 35, that run the entire length of the cars terminating in close proximity to connector cars 57, FIGS. 6, 8 and 9.

FIG. 6 illustrates a dual rail. Extending from the circularly shaped structure 51 within the interior of a spherical connector car 57 is a wing 36 which is above and to the sides of each connector car. Journaled on its undersurface is the center steel wheel 41 guided by rail 48 on support 58. On each side of the steel wheel are rubber traction wheels 42 that are supported on flanged track 43. When a curve is approached it is not abruptly initiated or terminated but a gradual transition is allowed.

Air under pressure from duct 49 enters apertures 46 through a similar opening on the traversing flange 39 which is nested in an arcuate slot in spherical socket 40. This effects the wheel alignment to both rails. Bearing 37 on which the combination wheels are journaled is flexibly connected to the wing by bars 44 (see FIG. 8) which is a part of the internal structure of the wing. Bearing 37 is held against socket 40 by shaft 45 upon which the bar 44 is pivoted by the tilting of wing 36. Track 43 and rail 48 are slightly raised above the inner track and rail, not shown, on curves. On tilting of the wing upward or downward the inner end of the wing where it joins arcuate structure 51 moves within cutaway section 47 on the exterior of the spherical connector car, FIG. 6. Shaft 52 extends through the combination wheels 41, 42 and is secured to bearing 37 by clevis 38.

FIG. 7 shows the longitudinal extending side pneumatic bearings 60 with a roller bearing 61 on the concaved lower inside surface 62 engageable with flat plate 63 on the lower convex surface of car side projection 64. It is not intended that these two surfaces should be in contact so that any friction results. This is merely for support when the transport is not in motion. Under the full length of each car between floats 5 is a runner 12 which is connected to the transport undercarriage by struts 33. The mass of the car is supported by said runner which rests upon and in turn is supported by rollers 17 spaced between air levitation channels 20, FIGS. 1 and 4. Against the floor of the channel are gas or air ports 18 for exerting downward pressure imparting lift throughout the entire length of the transport. Immediately above the car runner are air spaces and pneumatic floats 5, which because of clearance 7 allows the floats to move freely within pneumatic tube 2. The floats outside surfaces are thus spaced from the interior of pneumatic tube 2.

The gas under pressure issuing from the plurality of ports 8 is directed obliquely in opposed relationship to the interior surface of tube 2 and imparts forward motion and lateral stability to the transport.

The car runner 12 operates as the car support against the recessed surface 15 of each roll 17 and as a levitation device in the channels 20 between rolls, where the two surfaces are in close proximity to each other. The relative slightness of the runner in relation to the over all dimension of the car concentrates the mass to limit its surface contact, so that friction and resulting vibration is localized.

Because of the instantaneous impact of the car runner on the rollers 17 with the transport traversing a group of rollers in a matter of 3 to 5 seconds the roll ends are made to float in a socket FIGS. 1 and 2 provided with oil under pressure. The spinning roll spins a shaft 29 projecting from the roll ends so that the oil pressure in chamber 28 increases with the rapid rotation of the rollers, in addition to the hydrostatic oil pressure from the pressurized supply lines. Since hydrostatic lifts are known to lift mass with relative ease the advantage of these rollers for extremely rapid movement is utilized.

The air under pressure that is dissipated from the floats 5 and from the undersurface of the runner, provides the maximum cushioning effect against the longitudinal air bearing 34 for the full extent of each transport, FIG. 4. This bearing 34 is longitudinally slotted at 69 so that it responds to the air under pressure in the pneumatic tube as an airfoil. Also its exterior surface allows air movement upwards, as shown by arrows so that additional stability is given laterally particularly at the sides of undercarriage spaces 3, FIG. 1.

The air under pressure is not vented into the atmosphere but is forced against the interior walls of the side airfoils 35 that surround the upper half of the pneumatic tube which are attached to the undercarriage of the transport. These airfoils 35, FIG. 4 extend the full length of each car. Rapid air movement is induced at the nose of each float as it must penetrate air pressure buildup resulting from pressure gas issuing from the gas ports of the forward floats under front cars. The contoured frontal part of the floats 5 deflect air to the sides and the air intakes 10 where upward or downward resistance would be encountered conduct air under pressure through the float and expel it around the sides of the prime mover at the rear of the float.

Figure 8:
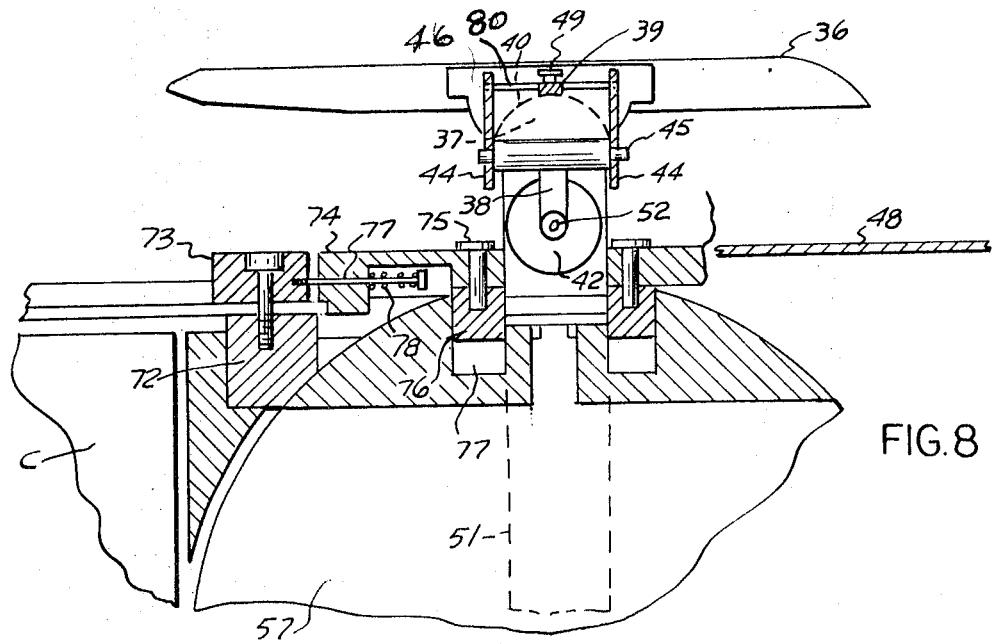
FIG. 8 is a fragmentary section showing car connector connections to a car.

The sweptback wings, FIGS. 6 and 8 at the top of each connector 57 place the wheel housings above and to the sides of the cars enabling the cars to pass beneath the two curved overhead tracks 58, one of which is shown. They also provide lateral stability. The wings 36 on each side of the connector car with wheels 41—42 at each extremity are secured to a circular structure 51 that moves inside of each spherical-shaped connector car 57.

OPERATION

On the approach of a curve the combination wheel 41 engages rail 48 and the rollers 42 engage a flat surface on each side of the rail. Momentarily the transport has a duality of support from the pneumatic tube and the upper tracks. The pneumatic tube 2 terminates immediately before the curve. The two rubber-tired traction wheels 42 on each side of the steel roller wheel 41 with wider wheel base insures high-speed movement of the cars. Whenever a curve is encountered the outside rail and wheel surface is upward to counter centrifugal force. Various adjustments occur such as a tilting of the wings, a slight rotation of the connector car on its circular bearing 51, and a movement in the wheel housing to compensate for the change in track elevation. The pivotal movement is accommodated by the rounded wheel socket 40 whose side movements are transverse to arcuate flange 39 recessed in said socket.

At great speed of the wheelless transport, the rollers 17 would rotate a great number of revolutions in perhaps 3 or 4 seconds. The higher the fluid pressure in chamber 28, FIG. 2 the less vibration. Since the duration of spin of each roller is very brief there must be an external supply of pressurized fluid as at 31. The spinning roll is centered by the use of three ball bearings 25 at opposite ends of each roller.

BEARINGS

Encyclopedia Britannica

There are three general classes of bearings: hydrostatic externally pressured bearings and roller bearings.

Hydrodynamic bearings: when an oil is interposed between a shaft and the outer member surrounding the shaft an important phenomenon occurs as the shaft begins to turn. This phenomenon, the wedge effect, results in self generated pressure sufficiently high to support the load on the shaft.

Hydrostatic bearings: may be in the form of oil pads, step bearings or lifts. Lifts—hydrostatic lifts, are used to displace shafts radially away from the bearing. Thus, separated, the shaft can be safely rotated. Once sufficient speed is attained, hydrodynamic pressure takes over; thus, the lift supplements the ordinary journal bearing.

Roller bearings: the modern roller bearing is an assembly consisting of four parts: the inner ring or race; the outer ring or race: the roller element; and the separator or cage or retainer.

Figure 10:
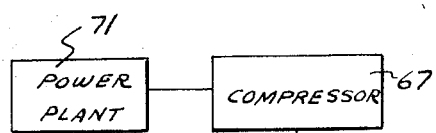
FIG. 10 is a block diagram of the power plant system.

As shown in the diagram, FIG. 10, a source of pressurized air is provided for the transport system. A power plant 71 is provided connected to compressor 67.

By suitable conduits 68, FIG. 3, air under pressure or gas is supplied to the jet-propelling tubes 9 of floats 5 and to conduits 19 for direction through outlets 18 into levitation channel 20.

Compressed air is supplied to conduits 8 in floats 5 for outletting into pneumatic tube 2, FIG. 1. Compressed air is delivered to conduits 49 of car-connector wings 36 for exiting through pipes 46, FIG. 6. Compressed air is also supplied to car stabilizer conduits 70, FIG. 7.

SPHERICAL CAR CONNECTORS

The spherical car connector 57 adapts the transport to curved portions of the track. A series of spaced arcuate bronze bearings 72 are mounted on the ends of the cars internally thereof, and anchored to plate 73 by fasteners. These are adapted to receive the spherical car connectors 57 so that the surface of the connector fits snugly, allowing relative movements in all directions.

A flexible connection is provided between each car and the adjacent connector. At the top of the car and car connector there is an axial arm 74, which at one end mounts a removable pin 75. Said pin extends down into block 76 in bore 77 at the car connector.

The opposite end of arm 74 is variably spaced from plate 73 and is loosely connected thereto by one or more elongated headed shafts 77, mounting coil springs 78, which are interposed to allow for flexiblity as shown in FIG. 8.

Wing conduit 49, FIG. 8 joins a right-angularly related passage extending through bearing flange 39. Said passage variably communicates with the pair of aligned socket passages 80 which are adapted for registry with plate apertures 46, FIG. 6.

The flow of pressurized air from conduit 49 through the passage in the bearing flange 39 and through the passages 80 and plate apertures 46 is adapted to stabilize the roller mounts of each wing assembly during the period that the roller assembly is passing through air space along the straight portion of the channel tracks.

Having described my invention, reference should now be had to the following claims.

I claim:

1. In a high-speed transportation system, characterized by a plurality of interconnected transport cars, having power plant means for propelling the cars along a track and for creating a source of pressurized air for a levitation-type car-supporting and stabilizing system, the improvement which comprises:
    a continuous track having rectilinear and curved portions adapted to support a series of transport cars and car connectors;
    the rectilinear portions including a continuous channel;
    the curved portions including laterally spaced pairs of arcuate car-connector mounting means;
    longitudinally spaced standards supporting said channel and mounting means;
    a series of longitudinally spaced transversely extending rollers journaled upon said channel;
    and upwardly extending levitation channels interposed between the spaced rollers along the length of said channel;
    a continuous pneumatic tube spaced above said rollers aligned with and supported on said channel throughout its length;
    said tube having continuous slots in its top and bottom;
    each of the transport cars having an undercarriage throughout its length extending into said pneumatic tube;
    an elongated runner extending longitudinally of said tube centrally thereof projecting through its bottom and movably mounted and centered upon at least a pair of said spaced rollers; and
    a pair of longitudinally spaced prime mover guide floats interposed between and secured to said undercarriage and runner, movable loosely through said tube throughout its length.

2. In the transportation system of claim 1, a centrally disposed jet tube extending through each float and terminating in a trailing jet outlet; and
    conduit means connected to said power plant for directing gas or air under pressure through said jet outlets.

3. In the transportation system of claim 2, a tube surrounding said jet tube extending through each float and connected to said runner; and
    a plurality of parallel spaced open ended air bypass tubes within said tube throughout the length of each float.

4. In the transportation system of claim 1, an air duct extending within and along the length of said runner connected to said source of pressurized air; and
    a series of longitudinally spaced downwardly extending air outlets for delivering air under pressure along the length of said runner into said levitation channels and against said rollers.

5. In the transportation system of claim 4, the compressed air accumulating in said levitation channel adapted for movement upwardly through the space between said pneumatic tube and floats and outwardly of the pneumatic tube undercarriage receiving slot.

6. In the transportation system of claim 5, a longitudinally extending air bearing interposed between said pair of floats, having an upwardly extending semicylindrical outer surface spaced from upper portions of said pneumatic tube defining therewith arcuate air outlet channels connected with the pneumatic tube top slot;
    continuous airfoils secured to each car along and adjacent its undercarriage and outwardly thereof, with internal curved surfaces spaced from the exterior of said pneumatic tube defining additional air levitation channels extending downwardly and outwardly of said pneumatic tube.

7. In the transportation system of claim 6, said air bearing in and along its undersurface being concaved and adapted to receive and react to the outward flow of compressed air from said levitation channel.

8. In the transportation system of claim 1, said rollers having aligned annular recesses therein;
    the undersurface of said runner along its length being tapered to cooperatively nest within said roller recesses centering said runner, floats and undercarriage within said pneumatic tube.

9. In the transportation system of claim 1, opposed pairs of hydrostatic bearings upon said track channel supportably journaling said rollers;
    said bearings having spherically shaped heads;
    said rollers at their ends being axially recessed of a corresponding shape to loosely receive said heads;
    an oil pipe adapted for a connection to a source of oil under pressure supported within said track channel;
    a plurality of conduits interconnecting said pipe with each of said bearing heads; and
    means sealing off the space between said heads and bearing recesses.

10. In the transportation system of claim 9, axial means on said rollers extending into said bearing recesses adapted on rotation to increase the pressure of the oil therein by which said rollers are journaled upon a column of oil under pressure.

11. In the transportation system of claim 10, and ball bearings on said bearing head and engaging said rollers within said bearing recess.

12. In the transportation system of claim 11, the means sealing off the space between said heads and bearing recesses being an air seal;
    a pipe adapted for connection to a source of air under pressure mounted on said track channel; and
    a series of conduits interconnecting said air pipe with said bearing air seals.

13. In the transportation system of claim 1, each of said floats having along its length and adjacent its lower half a series of closed air passages connected to said source of compressed air; and
    a series of downwardly directed rearwardly extending jet outlet tubes for delivering air under pressure to adjacent surface portions of said pneumatic tube.

14. In the transportation system of claim 1, a series of longitudinally extending side support bearings positioned on opposite sides of said track channel;

there being continuous opposed transversely concaved channels in said side support bearings;

longitudinally extending side supports projecting laterally of each car of convex shape for movement through said channels;

a series of longitudinally spaced transverse roller bearings upon said side support bearings spaced below said car side support; and metal runners within and along the undersurface of said side supports normally spaced from said roller bearings and adapted to rest thereon selectively when the car is stopped.

15. In the transportation system of claim 1, said car connector being spherically shaped and flexibly and pivotally interposed between the ends of a pair of adjacent cars;

a pair of wings extending outward from each car connector adjacent its upper end;

said car-connector mounting means including an arcuate track; and roller means flexibly and pivotally mounted on and depending from said wings guidably mounted and movably supported on said arcuate tracks.

16. In the transportation system of claim 15, said arcuate tracks including a central rail and on opposite sides thereof a pair of arcuate trackways;

said roller means including a central steel roller mounted on said track and a pair of spaced rubber rollers operably mounted on said pair of arcuate trackways.

17. In the transportation system of claim 15, said arcuate tracks including a central rail and on opposite sides thereof a pair of arcuate trackways;

said roller means including a central steel roller mounted on said track and a pair of spaced rubber rollers operably mounted on said pair of arcuate trackways;

the flexible and pivotal mounting of said roller means including a spherically shaped bearing;

a clevis depending therefrom mounting a shaft journaling and retaining said rollers;

a spherically shaped socket on the undersurface of each wing receiving said bearing; and a pair of plates depending from said wing on opposed sides of said socket and at their lower ends pivotally connected to said clevis at right angles to said roller mounting shaft.

18. In the transportation system of claim 17, there being an arcuate undercut transverse channel in the undersurface of said socket; and an arcuate flange on said spherically shaped bearing guidably nested in said channel.

19. In the transportation system of claim 18, a pressure air delivery conduit in said wing adapted for connection to said source of compressed air, and extending to said socket;

there being an aperture in said bearing flange communicating with said conduit;

air passages in said socket extending to said bearing flange and in communication with the aperture therein, there being corresponding apertures in said socket-connected plates whereby the flow of compressed air through said conduits, said bearing, flange and air outlets tends to stabilize said wing-supporting rollers when the same are moving through air along rectilinear portions of said channel track.